April 28, 1970 P. T. KACHUK 3,509,438
MOTOR AND TRANSISTORIZED DRIVE CIRCUIT THEREFOR
Filed Aug. 10, 1967 5 Sheets-Sheet 1

INVENTOR
PAUL T. KACHUK
BY
*Trask, Jenkins & Hawley*
ATTORNEYS

April 28, 1970     P. T. KACHUK     3,509,438

MOTOR AND TRANSISTORIZED DRIVE CIRCUIT THEREFOR

Filed Aug. 10, 1967     5 Sheets-Sheet 2

INVENTOR
PAUL T. KACHUK
BY
*Trask, Jenkins & Hanley*
ATTORNEYS

April 28, 1970 P. T. KACHUK 3,509,438
MOTOR AND TRANSISTORIZED DRIVE CIRCUIT THEREFOR
Filed Aug. 10, 1967 5 Sheets-Sheet 3

INVENTOR
PAUL T. KACHUK
BY
Frask, Jenkins & Hawley
ATTORNEYS

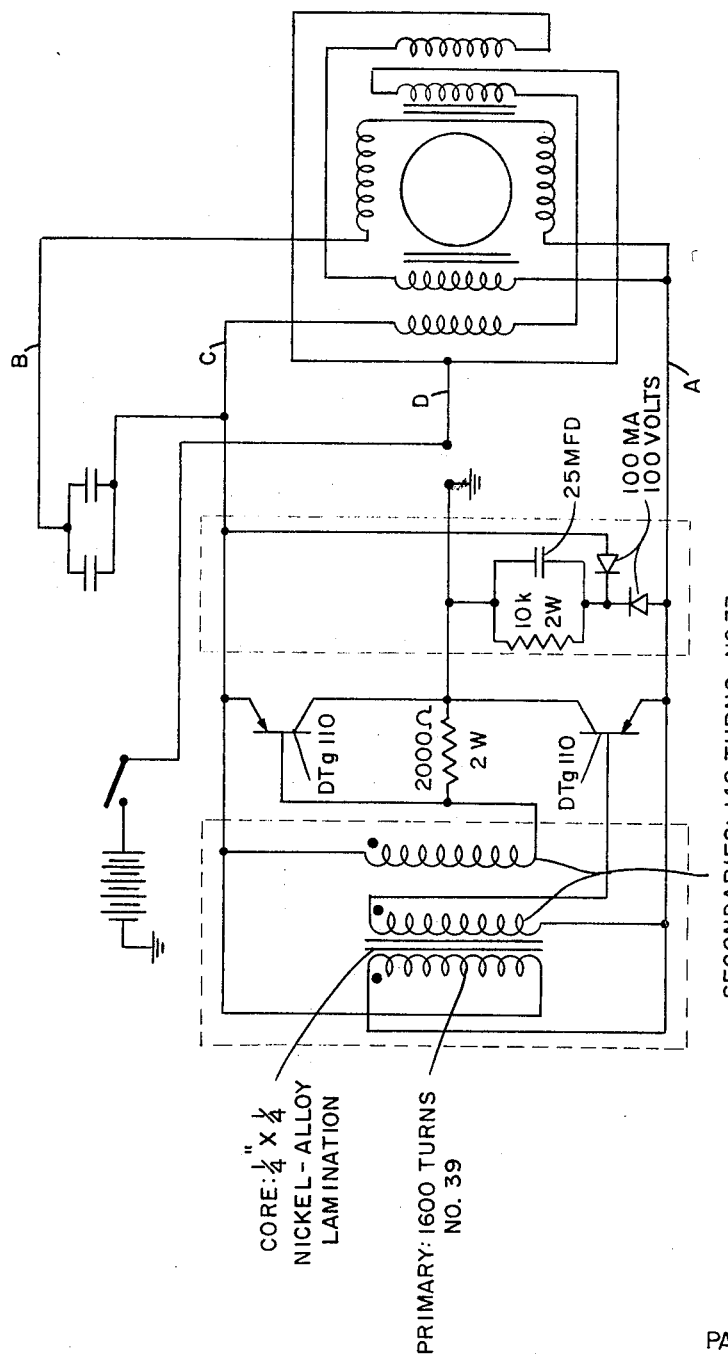

United States Patent Office 3,509,438
Patented Apr. 28, 1970

3,509,438
MOTOR AND TRANSISTORIZED DRIVE CIRCUIT THEREFOR
Paul T. Kachuk, Fort Wayne, Ind., assignor to Tokheim Corporation, Fort Wayne, Ind., a corporation of Indiana
Filed Aug. 10, 1967, Ser. No. 659,652
Int. Cl. H02k 29/00
U.S. Cl. 318—138                                      7 Claims

ABSTRACT OF THE DISCLOSURE

A brushless motor driven as an AC motor from a DC source by means of an oscillator circuit of which the motor forms a part. The plural poles of a substantially conventional squirrel-cage motor structure are bifilar wound with the two halves of a center-tapped winding which is connected to a pair of transistors in a push-pull arrangement. A small transformer has its primary winding in parallel with the motor winding and has bifilar secondary windings to provide feedback signals to operate the two transistors to supply drive current to the field winding. The circuit components are compactly arranged in an assembly disposed at the top of a motor-pump unit which may be submersible in gasoline or other fuel. Sufficient resistance is incorporated in the transformer secondary windings to limit the power supplied to the motor under excessive load conditions. In combination with a positive displacement pump, this is used to limit the output of the pump and eliminate the need for a pressure by-pass valve.

BACKGROUND OF THE INVENTION

This invention relates to a brushless motor and drive circuit, to be energized by DC current and especially adapted to meet the conditions of mounting and operation as a pump motor in a tank for gasoline or other fuels; and to a combination of such a motor with a fuel pump.

It has heretofore been proposed to drive an AC type motor from a DC supply source by providing a transistorized converter or drive circuit to generate and supply to the motor AC or pulsating current when energized from the DC source. This is desirable for automotive vehicles which conventionally have a DC battery power source, and is especially desirable for a motor to drive pumps for gasoline and other fuels. Heretofore, however, no such proposal has met the practical requirements of low cost of production and operation required for such applications.

In gasoline and other fuel supply systems it is often highly desirable or essential that the fuel be pumped by a pump located in the fuel tank and it is advantageous to provide such a pump as part of a motor-pump unit. For such fuel pumping applications, brush-type motors present a number of problems, yet automotive DC power supply sources conventionally require brush-type motors. Not only are such brushes undersirable in the presence of fuel because of sparking, but even more important is the effect of fuel on brush operation. The fuels are insulating materials whose presence between the brush and the motor commutator interfere with proper operation, and if brush pressure is increased sufficiently to secure effective operation, then wear problems arise. Special brush compositions have been proposed, as in U.S. Patent Nos. 2,370,590 and 2,441,421, but these are only partially successful and are highly expensive.

In accordance with the present invention, a motor having a squirrel-cage type rotor, and provided with a field core forming at least one pair of field poles and wound with at least one pair of field windings, is directly combined in cooperating relation with a drive circuit which, when connected to a DC source, supplies alternating or pulsating current to the field windings to drive the rotor. The drive circuit includes two power circuits connected respectively to the field windings, and each is connected to be controlled by the power circuit of a transistor. Each transistor has a base or control circuit which is connected in feed back relation with the motor field. The transistor circuit is similar to a known push-pull multi-vibrator circuit.

Preferably, the feed back control to the transistors is obtained through a feed back transformer having a primary winding connected in parallel with the pair of field windings and with secondaries connected to control the transistor base circuits.

In such a transistor-controlled power circuit, it is essential to avoid the generation of "spikes" in the fluctuating output current supplied to the motor which are of such magnitude as to destroy the transistors; and it is in general desirable to minimize such spikes; and in many instances it is essential to avoid any such spikes which would cause radio frequency interference or noise which might interfere with nearby electronic equipment. This is especially the case where the motor or the motor pump is to be installed in a military vehicle, yet such military installation is one of the most important applications of the present invention. In accordance with the present invention, a number of provisions are made which combine to minimize such spikes, and which can be supplemented, when desired, by a relatively simple and inexpensive spike suppressing network to eliminate such spikes as are generated. These provisions include the following.

(1) The transistors are controlled by a feed-back saturable transformer which can be of quite small phyical size so that it utilizes only a small mass of core material. This smallness in itself tends to reduce the spikes produced in effecting core saturation, and also permits the use of higher quality core material to further reduce the spikes, without incurring excessive cost for the core material.

(2) The transistors used are selected for their low spike-generating characteristics. I find that transistors of different makes, although otherwise equivalent, may have considerably different characteristics with respect to the generation of spikes. While this is a matter of selection between available transistors which are otherwise suitable, and forms no part of my invention, nevertheless it is a significant factor to be taken into account in practicing the invention.

(3) In winding both the motor and the saturable transformer, all magnetically coupled windings are wound in a manner which will give close and balanced coupling relationships. I preferably use a motor having at least one pair of main poles, I divide the field windings for such poles with equal parts dual-wound on each pole, and I preferably wind such windings as bifilar windings. In a two pole motor, for example, the two field windings will each be divided between the two poles and will preferably be bifilar wound on such poles. Also, the two secondary windings of the saturable transformer, which are connected to the base circuits of the two transistors, are wound in a bifilar manner.

(4) In connection with this matter of avoiding spikes, it is significant to note that operation at low frequencies tends to produce less spikes, and permits the use of lower grades of core iron for the feed back transformer, and I preferably design the motor and drive circuit to operate at low frequencies of the order of 100 cycles.

The use of a saturable transformer permits the system to operate in the mode of core saturation rather than transistor saturation, without the necessity of saturating the core of the motor, which necessarily is of larger mass than that of the relatively small saturable transformer. Such core-saturation mode of operation is advantageous over a transistor-saturation mode for a number of reasons. For example, the transistor-saturation mode would require careful and exact matching of the characteristics of the transistors, and selection of the transistors to get a desired frequency, and the frequency would tend to shift with the load. The core-saturation mode provides greater uniformity and better control in establishing a desired frequency, tends to maintain the frequency regardless of load, and permits the selection of transistors to be made on a broader basis and to meet other requirements.

The motor may have any of a number of conventional starting arrangements for automotive fuel pump use, but I prefer to use a split phase capacitor type motor, which provides both capacitor start and advantageous running conditions.

For automotive use, and especially for a motor-pump unit, there is a mechanical problem of locating and mounting the drive circuit components and other components included for motor starting purposes. In accordance with the invention, I provide a component assembly which includes the drive circuit components and may also include the capacitors for the split-phase capacitor motor which I prefer to use, and I mount that component assembly as a unit with the motor so that the motor and component assembly and pump form a self contained unit for which the only necessary external electrical connections are a ground connection and a single wire power connection.

The motor and its transistorized drive circuit in accordance with the invention has the further advantage that it may be designed to suit the pumping or other output requirements and to provide safety in its operation. For example, for a motor pump unit which is to be mounted in a gasoline or other fuel tank, or which is otherwise to handle gasoline, it is critically essential to avoid conditions of operation which would cause overheating of the motor. Either a centrifugal or positive-displacement pump mounted in a fuel tank can become locked as by the freezing of water in the pump or by the entrance of foreign matter into the pump, and if the motor is direct-connected to the pump, this locking will stall the motor. Provision must be made to prevent overheating of a stalled motor. Further, with a positive displacement pump, it is conventional to provide a pressure-relief or bypass valve which will limit the output pressure produced. In accordance with the present invention, I desirably include in the control circuits of the transistors sufficient resistance to limit to a selected value the current which will be passed by the power circuits of the transistors. By this means, I can limit the power supply to the motor to a value sufficient to produce the desired output, but insufficient to cause dangerous overheating of the motor if the motor is stalled. In a motor for a positive-displacement pump, I preferably adjust the resistance in the transistor base circuits to limit the power current to a value which will cause the motor to produce the desired pumping pressure but will cause the motor to stall when the pump pressure exceeds a predetermined value; and I thus eliminate the necessity for a pressure relief or bypass valve on the pump. While this output control can be obtained by means of external resistance in the transistor control circuits, I desirably provide it by designing the saturable transformer secondary windings to provide the desired resistance.

BRIEF DESCRIPTION OF THE DRAWINGS

The accompanying drawings illustrate the invention. In such drawings:

FIG. 5 is a duplicate of FIG. 2 in which component identifications and values have been entered by way of example for an embodiment which limits motor current to thereby provide stall protection and a maximum pump output pressure.

DETAILED DESCRIPTION OF PREFERRED EMBODIMENT A

Figure 1:
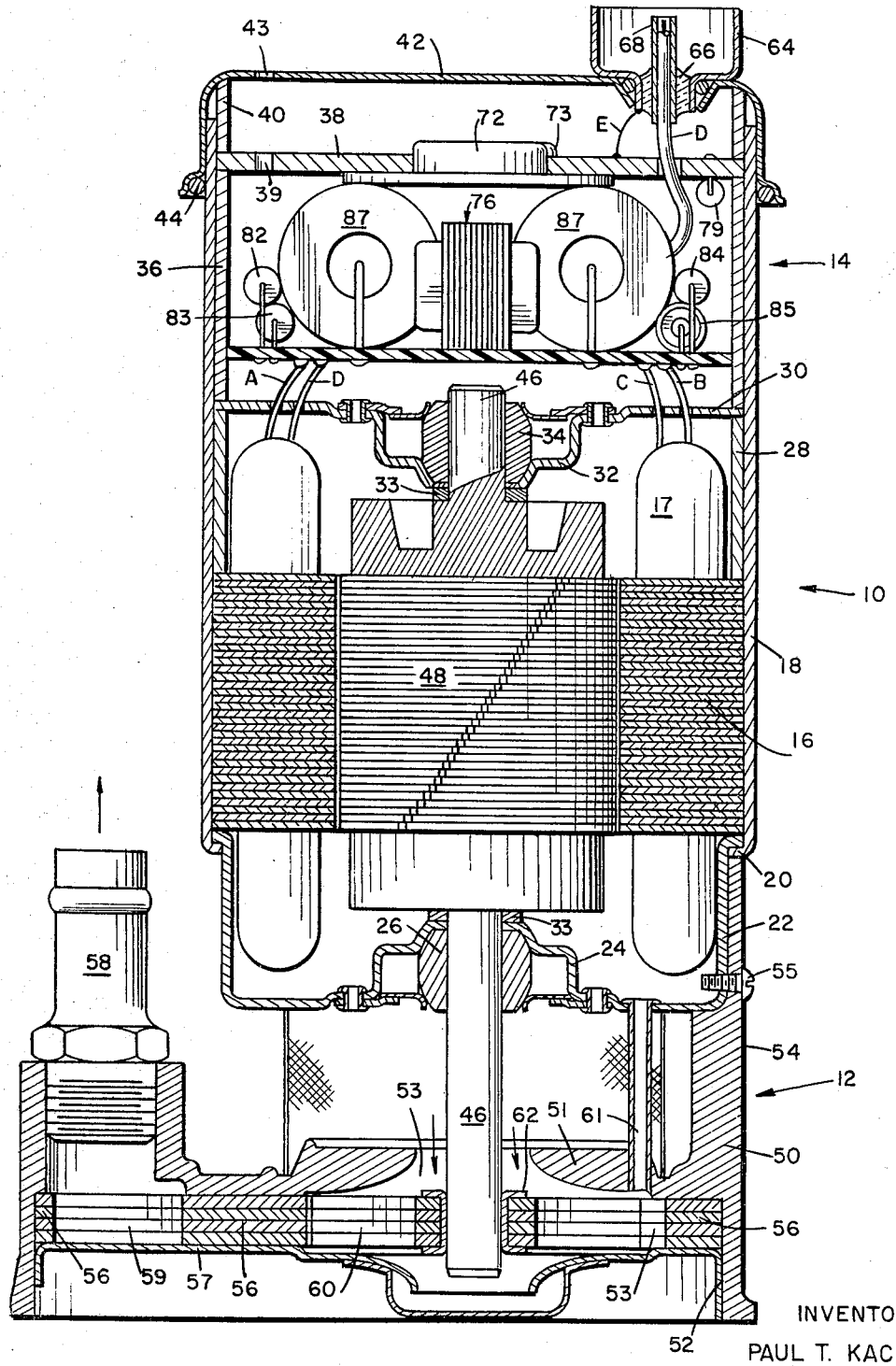
FIG. 1 is a vertical sectional view of a motor pump unit in accordance with the invention.
Figure 2:
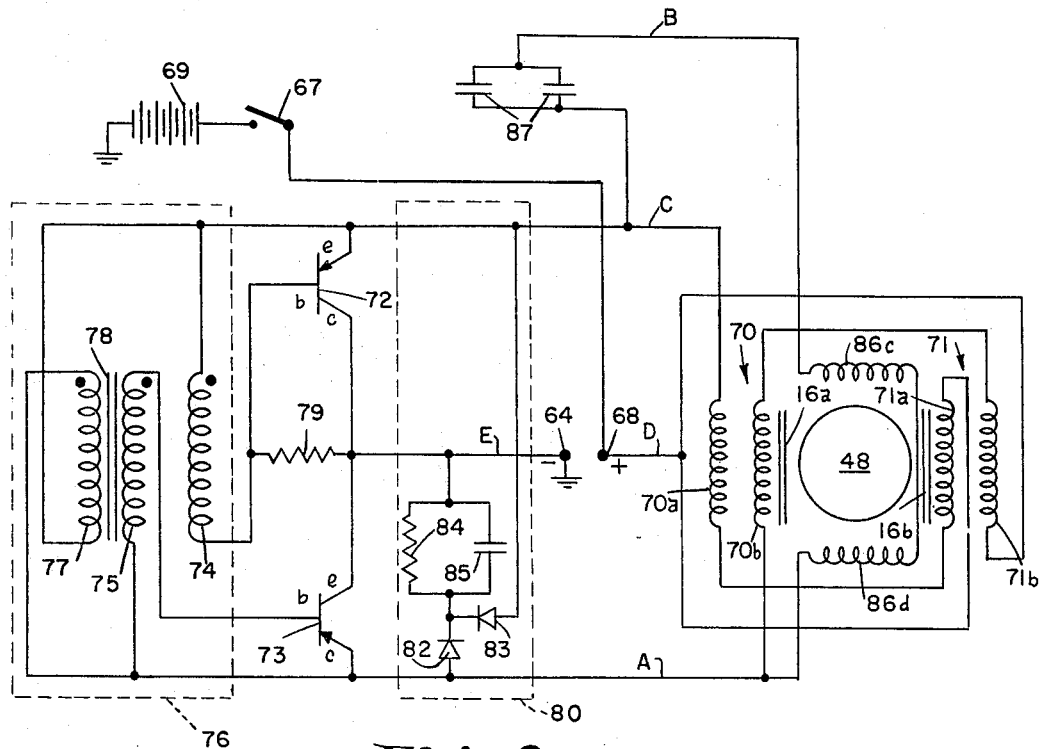
FIG. 2 is an electrical diagram showing the preferred circuit used in the pump unit of FIG. 1.
Figure 3:
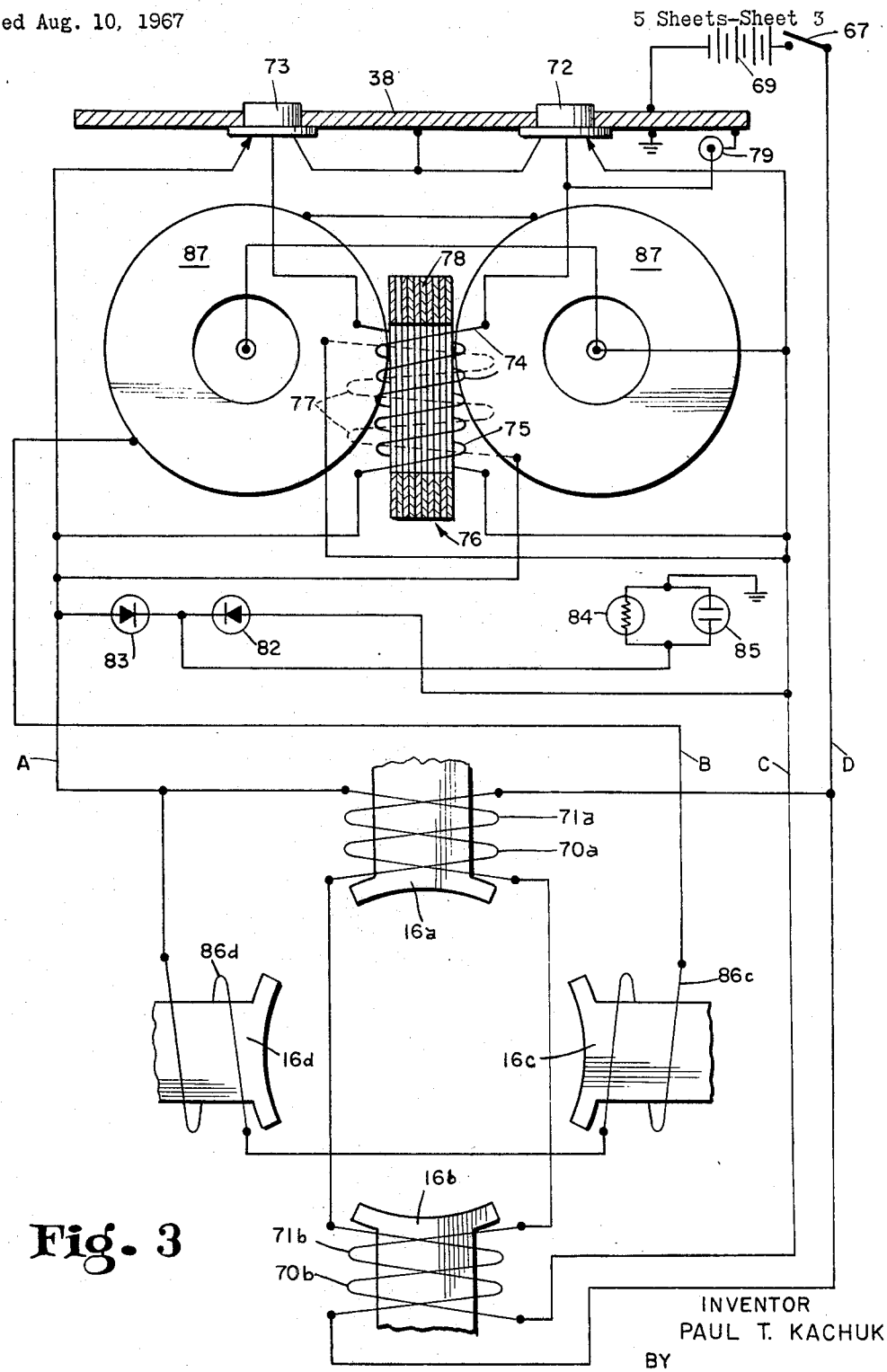
FIG. 3 is an electro-mechanical diagram showing a preferred components arrangement and a preferred field winding arrangement.

The preferred embodiment of FIGS. 1–3 comprises a motor 10, a pump assembly 12, and a components assembly 14 mounted in a unitary assembly adapted to be installed as a unit in a fuel tank.

A motor field assembly 16 is mounted in a main housing tube 18 which has an in-turned flange 20 at its lower end. A lower motor end bell 22 is engaged behind the lip 20 and is shaped to provide a central lower bearing support 24 containing a self-aligning bearing 26 of a type adapted to operate in gasoline, such as a carbon bearing. The field assembly including a core 16 and a winding 17 abuts against the outer flange of the end bell 22 and is engaged at its opposite end by a spacer 28 which supports an upper motor end bell 30 which is shaped to provide an upper bearing seat 32 which contains a self-aligning bearing 34. A second spacer 36 rests on the upper face of the end bell 30 and supports a mounting plate 38 for the components assembly 14. This mounting plate 38 is engaged by a third spacer 40 which is engaged and held in place by the end cap 42 which is slipped over the end of the main housing 18 and fixed in place by a bead of solder 44 or by other suitable locking means.

A motor shaft 46 is mounted in the bearings 26 and 34 and carries a squirrel cage rotor 48 for the motor. Desirably, the rotor is held against axial movement by thrust bearings 33 disposed between its ends and the end bells 22 and 30 of the motor.

The pump comprises a main casting 50 which is formed to define the upper wall 51 of the pump chamber 53, and to provide a downwardly open cavity 52 for the reception of lamination inserts. The casting 50 also forms a plurality of circumferentially spaced posts 54 which extend upward into engagement with the end bell 22 of the motor and are locked thereto as by screws 55. The pump is of the type shown in U.S. Patent No. 2,969,741 and is built up of a plurality of laminations inserted in the cavity 52. Outer laminations 56 which fit into the cavity 52 define the periphery of the pumping chamber 53 and a discharge passage 59 leading to the pump outlet fitting 58, and are held in place by an end wall 57. The pump impeller 60 is formed of a second group of star-shaped laminations held together by an eyelet or sleeve 62 which has a press fit or is otherwise locked on the lower end of the shaft 46.

The pump is provided at an intermediate pressure point with a bleed tube 61 leading to the interior of the motor casing 18–22–42, to supply liquid to the motor and components assembly, for cooling and lubrication. A small bleed opening 43 in the cover 42 and one or more openings 39 in the components mounting plate 38 provide for circulation of such liquid.

The motor is desirably a split-phase capacitor motor, and the required capacitor value is furnished by a pair of cylindrical capacitors mounted in the components assembly 14 as will be described. A single capacitor could, of course, be used, but the two parallel capacitors provide better space utilization and permit a compact motor and components assembly.

The motor field winding 17 is connected to the components assembly 14 by four motor leads A–D extending through openings in the end bell 30. The components of assembly 14 is supplied with current, and grounded, through a plug receptacle mounted on the cover 42 and comprising an outer shell 64 welded to the cover 42 and bonded through a glass insulating collar 66 to a central terminal post 68. Such receptacle is of the type shown in U.S. Patent No. 3,092,290, and is adapted to receive a supply plug connected to a lead cable having an outer grounding sheath and central supply wire.

The electrical circuits are shown diagrammatically in FIG. 2. The rotor 48 is operated by the field of the core 16.

The main motor windings 70 and 71 are each distributed in equal parts on the several main poles of the field core. In FIG. 2, the core is assumed to have two main poles 16a and 16b and the main motor windings 70 and 71 are each divided into two halves a and b which are wound respectively on the poles 16a and 16b. Thus, the poles are dual wound, and such windings are preferably bifilar. The windings 70 and 71 are connected at one end to a common or center tap to the main lead D and their opposite ends are connected respectively to main leads A and C.

A pair of semi-conductor devices, such as transistors 72 and 73, are connected in a push-pull manner across the centertap field winding 70–71 of the motor. Each transistor has a pair of principal or power conducting electrodes (emitter $e$ and collector $c$) and a control electrode (base $b$). In the circuits of FIG. 2, the emitters $e$ of the transistors 72 and 73 are connected to the main leads A and C which are connected to the outer ends of the center-tap field windings 70–71. The collectors $c$ of the transistors are connected to each other and to a ground lead E which, through ground, is connected to the negative terminal of a power supply battery 69. The ground connection corresponds to the outer shell 64 of the plug receptacle as shown in FIG. 1. The center-tap lead D is connected to a positive terminal corresponding to the center prong 68 of the receptacle and through it and a switch 67 to the positive terminal of the battery 69 shown in FIG. 2.

The base $b$ of the two transistors 72 and 73 are respectively connected to two secondary windings 74 and 75 of a feed back transformer 76 having a primary winding 77 connected between the main leads A and C. The other ends of the secondary windings 74 and 75 are also connected to such leads and through them to the emitters $e$ of the transistors, so that such secondary windings are in series between the emitters and the bases of the transistors. The feed back transformer has a saturable core 78 which is of small physical size and which is desirably formed of good quality core material such as nickel-iron laminations.

The transistor circuit operates as an oscillator or multivibrator. In order to provide a current for starting the oscillator, a small resistor 79 is desirably placed between the base electrode of one transistor, here shown as transistor 72, and the negative lead E and the negative terminal of the battery 69.

Although this circuit, when its windings are arranged as hereinafter described, does not tend to generate spikes of great magnitude, especially in comparison with various circuits of the prior art, a spike suppression circuit 80 may be included. This comprises a pair of diodes 82 and 83 having their anodes connected to the main leads A and C, and hence to the outer ends of the center-tapped field winding, and having their cathodes connected together and to one terminal of a filter circuit consisting of a resistor 84 in parallel with a capacitor 85. The opposite terminal of the filter circuit is connected to the negative lead E and the negative terminal of the battery 69.

The preferred split-phase capacitor motor, as shown, includes an auxiliary winding 86 connected in series with a pair of parallel capacitors 87. The winding 86 is distributed over the auxiliary poles of the motor field core 16 and as shown comprises two sections 86c and 86d on opposite poles 16c and 16d of the motor. The capacitors and auxiliary winding are connected in parallel with the center-tap field winding 70–71 and serve to provide a phase shifting for starting and running purposes.

The arrangement of the electrical parts and of the motor and of the transformer windings is shown in FIG. 1 (somewhat diagrammatically) and in FIG. 3. The two transistors 72 and 73 are mounted in the mounting plate 38 which serves as a heat sink for them and as a ground connection. The two capacitors 87 are mounted below the plate 38 and between it and a mounting panel 39, and are arranged in closely spaced parallel relation with their inner side faces substantially abutting the side faces of the core 78 of the feed back transformer. The resistor 79 is connected between the base $b$ of the transistor 72 and the grounded plate 38. The two diodes 82 and 83 are mounted to the left margin of the mounting plate 39 in the segment of that circular plate which lies below and beyond the left capacitor 87. The filter resistor 84 and capacitor 85 are mounted to the right margin of the mounting plate 39 in the sector beyond and below the right hand capacitor 87. The transformer 76 is mounted to the mounting panel 39 with the edge of its core between the two capacitors 87 and with its windings forwardly of the end of such capacitors 87.

As indicated in FIGS. 1, 2 and 3, the components assembly at the upper end of the motor is connected to the motor by four main leads A–D.

As previously indicated, the motor core 16 is desirably a multi-pole core, and for purposes of illustration, such field core 16 is shown in FIG. 3 with two pairs of salient poles 16a, 16b, 16c and 16d. As indicated, the halves 70a and 71a of the main field windings 70 and 71 are dual wound on the pole 16a, and are preferably bifilar wound. The other halves 70b and 71b are correspondingly wound on the opposite main pole 16b, and are preferably bifilar wound. Bifilar windings give a balanced and a close coupled relation between the two windings so that each half of the winding has substantially the same characteristics and the same relation to the field core as the other. While other arrangements of distributed dual windings may be used, I prefer to use the bifilar arrangement indicated in FIG. 3. The supplementary winding 86 is divided into halves 86c and 86d which are respectively wound on the other two field core poles 16c and 16d. The showing of four poles is for illustrative purposes, and other plural pole arrangements can be used in accordance with conventional motor design practices.

Operation of this embodiment of FIGS. 1–3 is as follows. When the circuit of FIG. 3 is energized from the battery 69, a slight base current will begin to flow in one of the transistors. In this case, because of the presence of the resistor 79, such flow will begin in the transistor 72. This slight base current will allow a slight collector current to flow in the transistor 72 which in turn will cause a voltage to build up across the field winding 70. By auto-transformer action, this will produce a voltage drop across the entire field winding 70–71, and such voltage drop will be impressed across the primary winding 77 of the feed back transformer 76. This will induce a voltage in the secondary 74 of the feed back transformer, which will cause a greater base current to flow in the transistor 72. This regenerative action will continue and will drive the transistor 72 to a full conductive state. Simultaneously, a voltage will be induced across the secondary winding 75 of the feed back transformer 76 and hence across the emitter-base circuit of the transistor 73 in a direction to oppose current flow in such transistor base circuit, and this will drive the transistor 73 into its "cut-off" region, so that no current will flow in its power circuit between its emitter $e$ and its collector c. The circuit will continue to operate in this fashion, with the transistor 72 conducting and the transistor 73 cut-off, until saturation occurs in the saturable core of the transformer 76. When the transformer saturates, the bias voltage to the transistor 72 will become constant, and consequently the current in the power circuit between the emitter and collector will become constant. As a result, the voltage across the field winding and across the transformer primary 77 will begin to collapse. This will reverse the voltages at the bases b of the transistors 72 and 73 so that the transistor 72 is driven to a cut-off condition and the transistor 73 becomes conductive. This produces the next half cycle of operation, in which current is supplied through the power circuit of the transistor 73 to the other field winding 71, to reverse the field of the motor. The second half cycle continues until the saturable core of the transformer 76 again saturates to cause the bias voltage on transistor 73 to become constant and consequently to cause the current in the power circuit to become constant. The voltage across the field winding and across the transformer primary again begins to collapse and, because of the regenerative feed back connections described above, such collapse continues until the transistor 72 again begins to conduct, whereupon the cycle is repeated.

The circuit thus operates as a multi-vibrator to supply alternating pulses of current to the field windings and to produce AC operation of the motor. In such operation, the supplementary windings 86 and the capacitor 87 function as they would in a conventional split-phase capacitor motor, to cause the field to rotate and thus to drive the squirrel cage rotor 48 at a speed controlled by the frequency of the AC current pulses, which may range from say 40 to 400 cycles per second.

In the operation described, the power output of the feed back transformer needs to be sufficient only to drive the base-emitter control circuits of the transistors. Therefore, the feed back transformer can be of very small physical size, and use a small saturable core.

The circuit described above, when designed as previously described tends to produce very small, if any, inductive spikes, and the spike suppressing circuit is provided when desired to further suppress such spikes as may occur. Any such spike will occur as a voltage peak in one of the lines leading to the diodes 82 and 83, and such diodes will pass the spike to the filter network 84–85. In the presence of a spike the capacitor will charge, thereby absorbing the spike. The resistor 84 provides a discharge path to ground for the capacitor. The resistor 84 is desirably made as large as can be tolerated in view of the frequency of operation and will therefore pass very little current during normal operation.

The frequency of the alternating current supplied to the field windings of the motor will tend to remain constant at a value depending upon the design and selection of the components of the circuit, and such constant frequency current will drive the rotor 48 of the motor at a substantially constant speed. The rotor will of course drive the impeller 60 of the pump and liquid will be pumped from the inlet openings of the pump to the discharge fitting 58. The pump will operate in a conventional manner as a centrifugal pump.

In the event the pump rotor should become locked, as by freezing water in the pump chamber or by foreign matter in the pump chamber, this will stall the rotor 48 of the motor. It is essential to avoid overheating of the motor in the presence of gasoline. To this end, the resistance of the secondary windings 74 and 75 of the feed back transformer is made sufficient to limit the current supplied to the bases of the transistors 72 and 73. This limitation will in turn limit the current in the power circuit of the transistors, between the emitters and the collectors, and by this means the power-circuit current will be held to a value which will avoid overheating or burning out of the motor in the event the pump is stalled. A similar action occurs in the modification of FIGS. 4 and 5 described below, and the component values shown on FIG. 5 are an example of the values which may be used to provide this feature of avoiding overheating or burnout in the event the pump is stalled.

DETAILED DESCRIPTION OF PREFERRED EMBODIMENT B

Figure 4:
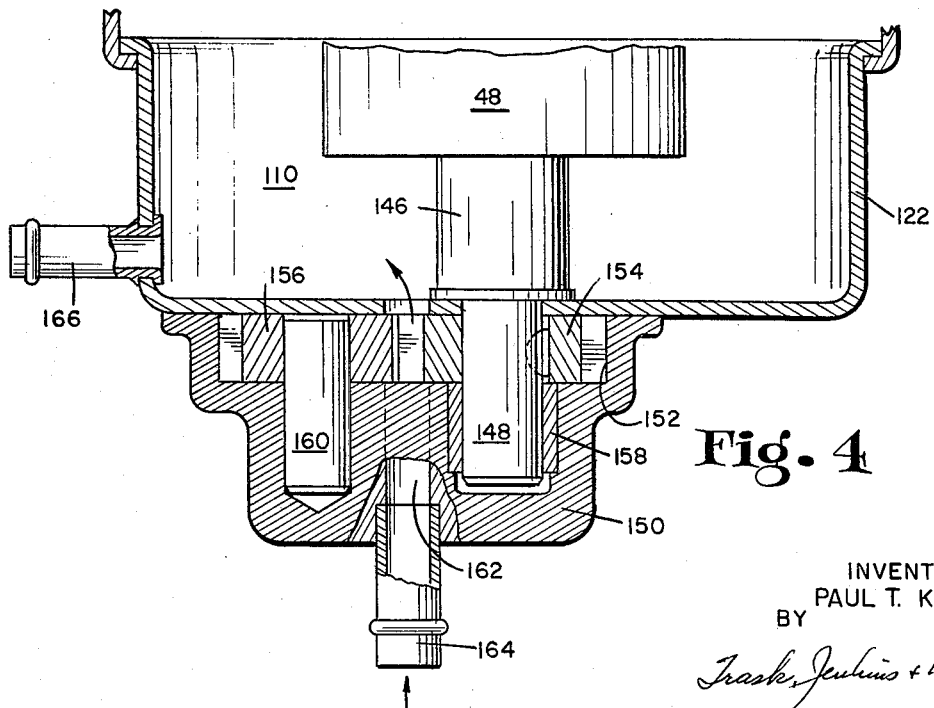
FIG. 4 is a partial section similar to FIG. 1, but showing a positive displacement pump for combination with the motor of FIG. 1.

The preferred embodiment of FIGS. 4 and 5 is like that of FIGS. 1–3 except that the pump is a positive displacement gear type pump. The components assembly 14 and the main body of the motor 10 are the same as in FIG. 1. The housing 18 and the cover 42 are also the same as in FIGS. 1–3 except that they are closed and the cover 42 does not have the bleed opening 43. The lower end bell 122 of the motor housing is formed as shown in FIG. 4 to serve as the upper wall of a pump housing, which closes the pump chamber in a pump casting 150 secured against that wall of the end bell 122. The housing 150 defines an 8-shaped cavity 152 for the reception of a pair of pump gears 154 and 156. The gear 154 is mounted on a reduced end portion 148 of the motor shaft 146 and the lower end of such shaft portion 148 is supported in a sleeve bearing 158 seated in the casting 150. The gear 154 is keyed or otherwise secured to the shaft portion 148 for rotation therewith.

The gear 156 is rotatably mounted on a stub shaft 160 mounted in the casting 150. A vertical inlet passage 162 formed in the casting 150 communicates with an inlet nipple 164 carried by the casting. The discharge port for the pump is formed by an aperture in the bottom wall of the end bell 122 so that the pump discharges into the motor cavity 110. A discharge nipple 166 is secured through the wall of the motor housing at any convenient location, here shown as in the side of the end bell 122, to provide a pump discharge outlet. The motor will be a wet motor as in FIG. 1.

The circuit of FIG. 5 is the same as that of FIG. 2 and operates in the same way. FIG. 5, however, is labelled with component identifications and values, and represents an example of a set of components and values which may be used and which will control the output torque of the motor and hence the output pressure of the positive displacement pump to a certain maximum level.

In the example of FIG. 5, the motor used was a 12 volt multi-pole motor built by an independent motor manufacturer employing standard procedures determined by such manufacturer, except that the field winding was center-tapped and its two halves were distributed over the several poles and were bifilar wound. The transformer used comprised a core built up of conventional stamped E-I nickel-allow laminations and having a ¼ by ¼ inch leg cross section. The two secondary windings each consisted of 140 turns of No. 33 copper wire, and the two were bifilar wound at the inside of the winding. The primary was wound outside and consisted of 1600 turns of No. 39 copper wire.

Conventionally, a positive displacement pump adapted to serve a varying demand, as in the case of a fuel supply pump of an automotive vehicle, requires a pressure-responsive by-pass valve so that during periods of low demand the pump will not generate excess pressure or motor load but will by-pass through the valve when a predetermined maximum pressure is attained. By the selection of values in the drive circuit of the present invention, the torque output of the motor can be limited and this will serve to regulate the output pressure of the pump and eliminate the necessity for any such by-pass valve. Also the circuit with such selected components and values will maintain the motor in safe operating condition through any period of excess load, whether resulting from pressure in the pump or from other conditions.

To exemplify the torque and pump pressure control, a series of tests were run with the motor and drive of FIG. 5 in which the resistance in the base circuits of the transistors was varied and measurements made of torque, stall point, and amperage drawn by the motor at the stall point. The results are shown in the following table.

| Resistance (ohms) | Maximum torque, at stall (inch-ounces) | Amperage at stall (amps) |
| --- | --- | --- |
| 3.5 | 15 | 5.7 |
| 5.0 | 14 | 5.1 |
| 6.5 | 13.5 | 4.95 |
| 8 | 13 | 4.85 |
| 9.5 | 11.75 | 4.85 |

It will be seen that increased resistances produced reduced torque values, corresponding to reduced pump pressures, and produced a lowering of the maximum current draw. In the test motor the amperage drawn in normal operation ranged from about 2 amps at no load to 4 amps at full load, and it will be seen that at all resistance levels the amperage at stall was held to levels which were only mederately above the full load amperage of about 4 amps and were within a range which would not burn out the motor in an operating environment providing a normal rate of heat dissipation.

DETAILED DESCRIPTION OF THE PREFERRED EMBODIMENT C

Figure 6:
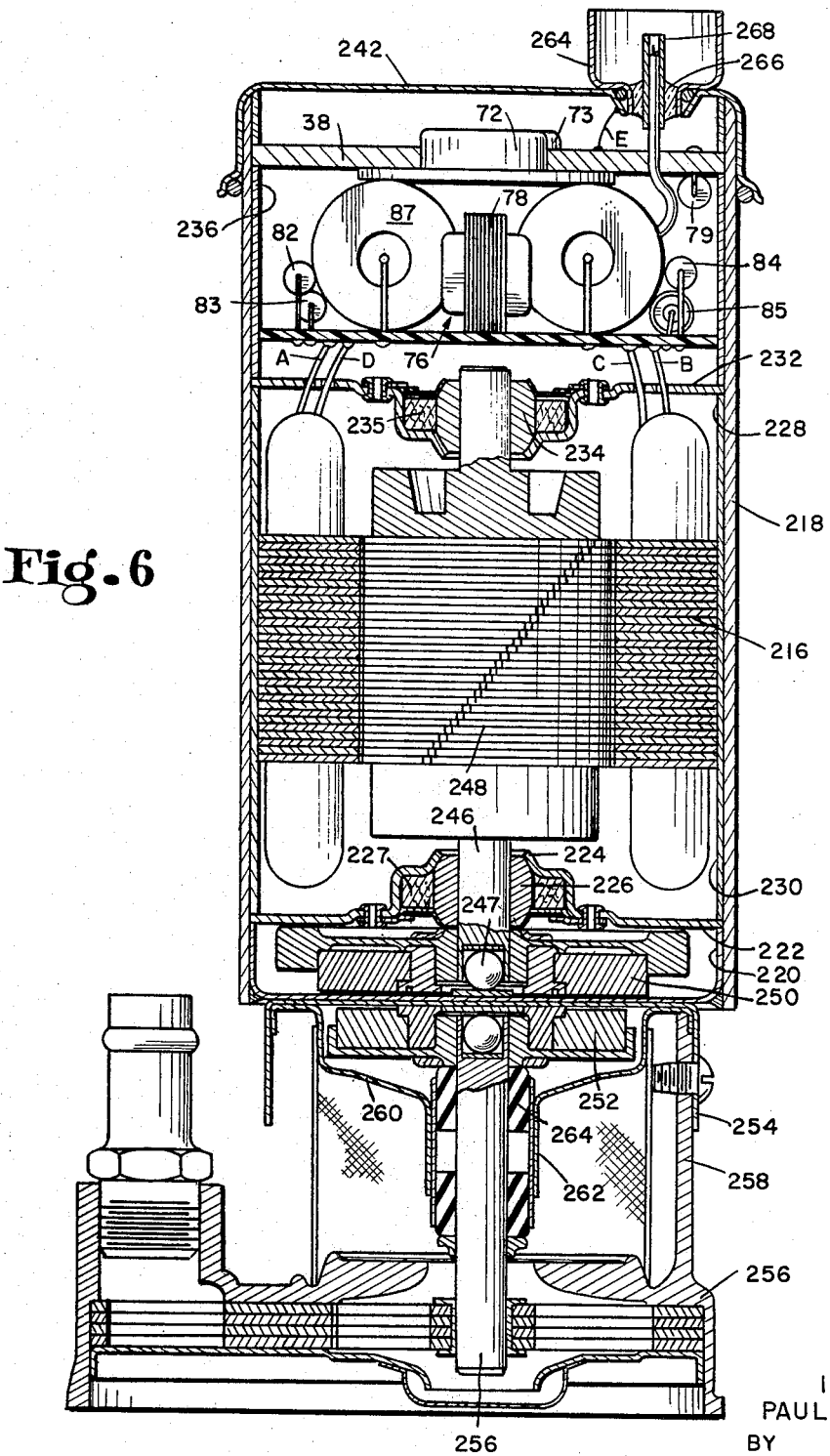
FIG. 6 is a sectional view of a modified motor-pump unit in which the motor is hermetically sealed in a housing and transmits drive to the pump through a magnetic coupling.

In the modification shown in FIG. 6, the components assembly and motor are the same as in the modification of FIG. 1 and 3. Similarly, the pump itself is substantially the same as that shown in FIG. 1. However, instead of connecting the pump directly to the motor shaft and bleeding part of the pump liquid through the motor housing to provide a "wet" motor, the motor of FIG. 6 is hermetically sealed, and drive is transmitted from the motor to the pump by means of a magnetic coupling operating through an imperforate end wall of the motor housing.

In the modification of FIG. 6, the motor housing comprises a tubular casing 218 closed at its lower end by an end bell 220 formed of sheet stainless steel or other nonmagnetic material. Such end bell 220 is soldered or brazed in the lower open end of the housing 218. A bearing end plate 222 is supported within the housing 218 against the upper edge of the end bell 220, and forms a seat 224 for a self-aligning bearing 226. In this case the bearing is a lubricated bearing and is surrounded by an oil reservoir pad 227. The bearing end plate 222 is held in place by a spacer 230 which abuts and supports the field core 216 of the motor. A second spacer 228 mounted against the upper end of the field core 216 supports a top bearing end plate 232 which forms a seat for an upper self-aligning bearing 234. Like the lower bearing, this is a porous lubricated bearing and is surrounded by a lubricant reservoir pad 235. Another spacer 236 resting on the bearing end plate 232 supports the plate 38 of a components assembly identical with that shown in FIG. 1, and this is held in place by a further spacer 240 which is engaged by the cover 242. In this instance, the cover is imperforate and is hermetically sealed to the upper end of the housing 218. As before, the cover carries a plug receptacle comprising an outer shell 264 and a central terminal prong 268 held therein by an insulating ceramic seal 266.

A rotor 248 is mounted on a shaft 246 in the bearings 226 and 234. The lower end of the shaft 246 is counterbored for the reception of a ball thrust bearing 247, and such shaft carries the driving member 250 of a magnetic coupling. The driven member 252 of such magnetic coupling is mounted in facing relation on the opposite side of the end bell 220, and is carried by the upper end of a pump shaft 256. For the purpose of mounting the pump, the end bell 220 of the motor housing carries a downwardly-open cup-shaped stamping 254 which provides a depending circular skirt. The pump is similar to that of FIG. 1 and comprises a main casting 256 which forms a pumping chamber and is provided with a plurality of circumferentially spaced upstanding posts 258. These fit within the depending skirt of the cup 254 and support at their upper ends a stamping 260 which is formed to provide a central cylindrical support 262 in which is mounted a pair of bearings 264 for the pump shaft 256. These bearings must operate in the fuel, and are desirably carbon bearings. The structure and operation of the magnetic coupling 250–252 is more fully disclosed in Patent No. 2,885,126.

In this modification of FIG. 6, the motor and components assembly are completely sealed within the housing and constitute a self-contained unit adapted to be mounted in submerged condition in an automotoive fuel tank. The components supporting plate 38 serves as a heat sink for the transistors and is mounted to make good heat conducting contact with the walls of the housing 218, so that heat will be radiated or conducted away by that housing. As in the other modifications, the resistance in the control circuits of the transistors is selected at a value which will limit the current supplied to the motor and thus will prevent the motor from overheating under any conditions of operation. However, the magnetic coupling 250–252 is preferably one in which each of the coupling members comprises a permanent magnet having a plurality of pairs of angularly displaced poles as more fully described in Patent No. 2,885,126; and it is characteristic of such a magnetic coupling that it normally operates in full synchronism and that if the synchronous relation is once lost, the coupling effect is greatly reduced if not completely lost until the relative rotation of the two coupling members is stopped and the magnets allowed to realign themselves. The use of such a magnetic coupling prevents the pump from stalling the motor. Accordingly, the values to which the power current is limited may be selected at a higher level than in the other modifications. In this modification, however, it is an advantage that the speed of the rotor 248 is controlled by the characteristics of the electronic supply circuit and is independent of the load, so that the motor does not run at excessive speed if the magnetic coupling loses its coupling relationship and relieves the motor of the normal pump load.

The operation of this modification is identical with that of the modification of FIGS. 1–3 except only that the motor and components assembly is a sealed unit containing its own motor lubrication, and that the drive instead of being direct to the pump is through the magnetic coupling 250–252.

I claim:
1. A brushless motor and drive circuit in combination with a positive displacement pump, comprising a motor core having at least one pair of poles,
   a squirrel cage rotor mounted for rotation in operative relation with said core and poles, said pump including a pumping element connected to be driven by said rotor,
   dual windings on said core adapted to be energized in opposite directions to produce an alternating magnetic flux in said core,
   a pair of terminals for connection to a D.C. power source,
   a pair of semiconductor devices each having first and second principal conducting electrodes and a control electrode,
   said dual windings each having one lead connected to one of said terminals, the other leads of said windings being connected respectively to the first conducting electrodes of the two semiconducting devices, the second conducting electrodes of said devices being connected to the other of said terminals, whereby the semiconductor devices are in push-pull relation and each controls the energization of one of said dual windings,
   a control circuit for each semiconducting device, including a feed-back winding connected to the control electrode of the device and connected to be inductively energized when the field winding controlled by such device is energized, to produce a regenerative feed-back signal controlling the said principal conducting electrodes of such device, each such control circuit including resistance to limit the current therein and thereby to limit the current in the principal conducting electrodes and the motor winding connected thereto, the value of such resistance in the control circuits being sufficient to limit the current in the motor windings to less than will cause the motor to overheat under excess load conditions and to a maximum at which the pump driven by the motor will produce not more than a predetermined output pressure, and thereby to limit the pump output pressure to a predetermined maximum.

2. A brushless motor and drive circuit as set forth in claim 1 wherein said feed-back windings are secondary windings of a feed-back transformer having a primary winding having its ends connected to said first conducting electrodes in parallel with said dual core windings, and said transformer has a core which saturates to switch said semiconductor devices alternatively between conduction and cut-off conditions.

3. A brushless motor and drive circuit, comprising a motor core having at least one pair of poles, a squirrel cage rotor mounted for rotation in operative relation with said core and poles, dual windings on said core adapted to be energized in opposite directions by an alternating voltage to produce an alternating magnetic flux in said core, a pair of terminals for connection to a D.C. power source, a pair of semiconductor devices each having first and second principal conducting electrodes and a control electrode, said dual windings each having one lead connected to one of said terminals, the other leads of said windings being connected respectively to the first conducting electrodes of the two semiconducting devices, the second conducting electrodes of said devices being connected to the other of said terminals, whereby the semiconductor devices are in push-pull relation and each controls the energization of one of said dual windings, a feed-back transformer including a primary winding having its ends coupled to said first conducting electrodes in parallel with said dual core windings, including two secondary windings, and including a saturable core for saturation in opposite directions in response to the alternating voltage which energizes the motor windings, the secondary windings of said feed-back transformer being respectively connected to form control circuits for said semiconductor devices, each secondary winding being connected in direct series connection between the control electrode and a principal electrode of its semiconductor device to apply a regenerative feed-back signal thereto, the said semiconductor devices respectively being thereby directly responsive to and solely controlled by the secondary windings of the transformer for continued switching of the respective motor windings controlled by the semiconductor devices between energized and deenergized conditions, the said dual motor windings being wound in close-coupled and balanced relationship to minimize spike generation, the semi-conductor devices having low spike-generation characteristics, the said feed-back transformer being of small physical size and the saturable core thereof being small in cross-section to minimize the energy required for its saturation.

whereby, without the necessity for additional spike suppressing circuitry, spike generation in the semiconductor device circuits is maintained below a level which would be destructive to the semiconductor devices in normal operation.

4. A brushless motor and drive circuit as set forth in claim 3 in which said transformer secondary windings are bifilar wound.

5. A brushless motor and drive circuit comprising a motor core having at least one pair of poles, a squirrel cage rotor mounted for rotation in operative relation with said core and poles, dual windings on said core adapted to be energized in opposite directions to produce an alternating magnetic flux in said core, a pair of terminals for connection to a D.C. power source, a pair of semiconductor devices each having first and second principal conducting electrodes and a control electrode, said dual windings each having one lead connected to one of said terminals, the other leads of said windings being connected respectively to the first conducting electrodes of the two semiconducting devices, the second conducting electrodes of said devices being connected to the other of said terminals, whereby the semiconductor devices are in push-pull relation and each controls the energization of one of said dual windings, a feed-back transformer including two secondary windings, and including a primary winding having its ends coupled to said first conducting electrodes in parallel with said dual core windings, control circuits for said semiconductor devices, respectively including said secondary windings and connected to the control electrodes of said respective semiconductor devices, each secondary winding being arranged to apply a regenerative feed-back signal to its semiconductive device when the feed-back transformer primary winding is energized in response to energization of the motor winding controlled by such semiconductor device, and a spike-suppression circuit comprising a parallel resistor and capacitor network connected across the principal conducting electrodes of each semiconducting device.

6. A brushless motor and drive circuit as set forth in claim 5 in which a single parallel resistor and capacitor network is connected at one end to both of said second conducting electrodes and at the other end, through separate diodes, to said first conducting electrodes.

7. A brushless motor and drive circuit comprising a motor core having at least one pair of poles, a squirrel cage rotor mounted for rotation in operative relation with said core and poles, dual windings on said core adapted to be energized in opposite directions to produce an alternating magnetic flux in said core, a pair of terminals for connection to a D.C. source, a pair of semiconductor devices each having first and second principal conducting electrode and a control electrode, said dual windings each having one lead connected to one of said terminals the other lead of each winding being connected respectively to the first conducting electrodes of the two semiconducting devices, the second conducting electrodes of said devices being connected to the other of said terminals, a feed-back transformer formed by a pair of secondary windings, and by a primary winding having its ends coupled to said first conducting electrodes in parallel with said dual core windings, said secondary windings being connected respectively to the control electrodes of the semiconductor devices, a tubular housing closely surrounding the motor, a components assembly mount within the projected area of the motor at one end thereof, said components assembly including said semiconductor devices and a heat conducting mounting therefor in heat conducting relation with said motor housing, and including said transformer, an auxiliary winding and capacitance means connected in series with each other and in parallel with said dual windings, said capacitance comprising a pair of elongated capactors mounted in chordal relation to said tubular housing and in said components assembly.

References Cited

UNITED STATES PATENTS

| | | | |
|---|---|---|---|
| 2,810,348 | 10/1957 | White | 310—66 XR |
| 2,911,918 | 11/1959 | Reed | 310—86 XR |
| 3,225,698 | 12/1965 | Spisiak | 310—66 XR |
| 3,321,687 | 5/1967 | Toth | 318—138 |
| 3,348,109 | 10/1967 | Wright | 318—254 XR |
| 3,364,408 | 1/1968 | Katz et al. | 318—138 |
| 3,324,368 | 6/1967 | Von Delden | 318—138 |

ORIS L. RADER, Primary Examiner

G. RUBINSON, Assistant Examiner

U.S. Cl. X.R.

310—66; 318—254